Dec. 16, 1952            K. RATH            2,621,540
COMBINED MANUAL AND AUTOMATIC WINDOW REGULATOR
Filed Sept. 22, 1949
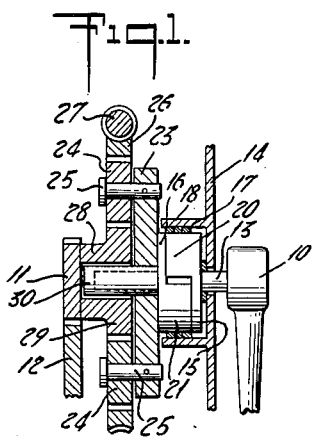
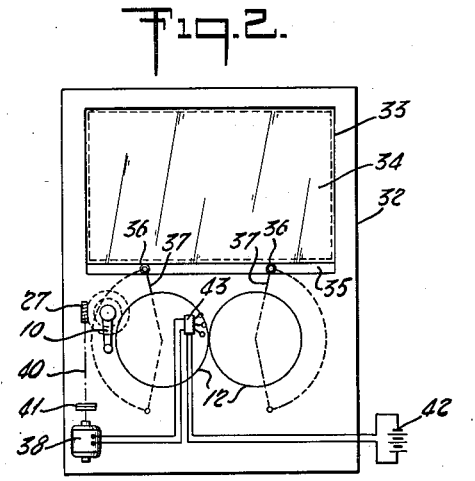
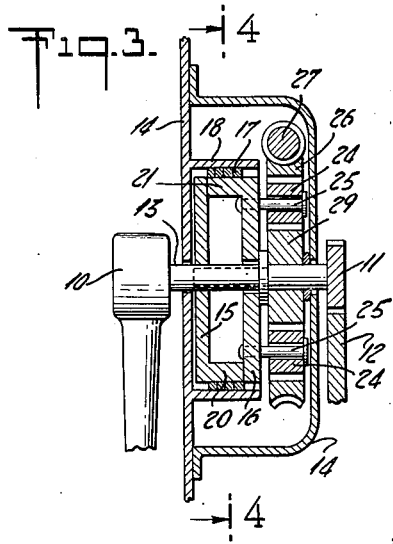
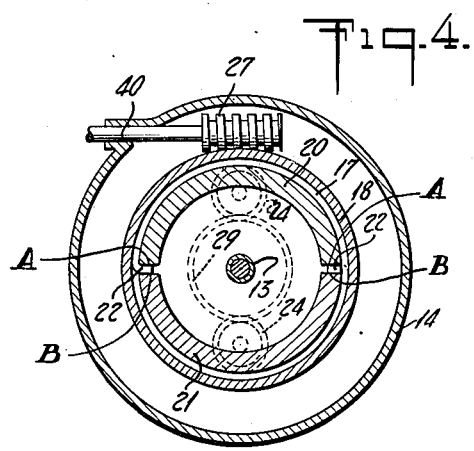
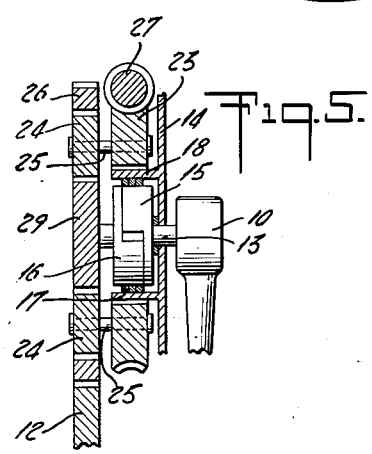
INVENTOR.

Patented Dec. 16, 1952

2,621,540

UNITED STATES PATENT OFFICE 2,621,540

COMBINED MANUAL AND AUTOMATIC WINDOW REGULATOR

Karl Rath, New York, N. Y., assignor to Hupp Corporation, Cleveland, Ohio, a corporation of Virginia Application September 22, 1949, Serial No. 117,114

9 Claims. (Cl. 74—626)

The present invention relates to window regulators, more particularly, though not exclusively, to regulators for use in motor vehicles of the general type disclosed in U. S. patent application Ser. No. 790,783, filed December 10, 1947 by Peter F. Rossmann and assigned to the assignee of the present application.

There is shown and described in the above-mentioned application a combined manual and/or automatic window control device, comprising a planetary gear assembly having a pair of side gears and a rotatable carrier cooperating with said side gears through one or more planet gears. According to the embodiment disclosed in said application, the carrier is in driving connection with the window operating mechanism, while the side gears are in driving connection with the manual and automatic driving means in the form of a hand crank or handle and an electric motor, respectively. The clutch connection between the hand crank and its associated side gear includes a one-way spring or friction brake which serves for the double purpose of locking the window during the manual operation and preventing it from reacting upon the handle by reason of its own weight or gravity, on the one hand, and of acting as a locking means during the motor driven operation for the planetary gear assembly to enable rotary power to be readily transmitted from the motor to the window. Similarly, an additional one-way coupling device, preferably in the form of a worm gear transmission is connected between the motor and its associated side gear to prevent power transmission from the hand crank to the motor shaft, on the one hand, and to lock the window against reaction upon the motor during the power driven operation.

In other words, both one-way coupling means, i. e. the spring clutch and brake, on the one hand, and the worm gear transmission, on the other hand, are alternately effective during the manual and motor driven operations of the window in preventing the window from reacting upon the driving members (hand crank, motor) due to its own weight or gravity and acting as a locking means for the idle or stationary element of the planetary drive, to allow of power transmission from the operative input element to the window, as will be further understood as the following description proceeds.

As a result, the window may be operated optionally either manually and/or automatically in both the same or opposite directions, substantially without any interaction between the operating members or driving sources and without requiring any adjustments or switch-over operations when changing from one to the other mode of operation. This in turn results in complete safety as well as reliability of the window control, including cases of accident, exhaustion of the car battery and other emergencies when the automatic control system has become defective or inoperative.

According to the present invention, the window is driven by one of the side gears of the planetary assembly, while the hand crank and motor serve to drive the planetary carrier and the remaining side gear, respectively. This arrangement, while allowing of either manual and/or automatic control of the window in substantially the same manner as in the case of the above-mentioned prior application, will enable the attainment of a different gear ratio provided by the planetary gear assembly which in certain cases may be desirable to facilitate the manual operation and to adapt the regulator to existing window control devices. Furthermore, this construction has the advantage of enabling a compact design of the regulator of reduced dimensions, especially in the axial direction at right angle to the door of a motor car, where space for mounting the regulator is limited.

Accordingly, among the objects of the invention is the provision of a multiple window regulating device of the above character which is both simple and compact in design; which comprises a window friction clutch and brake structurally combined with a multiple planetary drive; which may be used in connection with standard window control devices and which will enable operation of a window both manually and/or automatically to cope with any practical emergency; and which may be manufactured at low cost in compact or package form and suitable for installment in existing motor car doors.

Further objects as well as novel aspects of the invention will be better understood from the following detailed description taken in connection with the accompanying drawing, forming part of this specification and in which:

Fig. 1 is a vertical cross-sectional view of a multiple-drive window control device constructed in accordance with the invention;

Fig. 2 is a schematic assembly view showing, by way of example, an automobile door equipped with a window regulating device according to the invention;

Fig. 3 is a vertical cross-section of a window regulator according to the invention embodying a structurally combined window clutch and planetary gear assembly;

Fig. 4 is a sectional view, taken on line 4—4 of Fig. 3, and

Fig. 5 illustrates a modification of a regulator according to Fig. 1.

Like reference numerals identify like parts or elements in the different views of the drawing.

Referring to Figure 1, the numeral 10 represents a hand crank for manually rotating a gear 11 driving a standard window operating mechanism including a window control gear 12 in meshing relation with gear 11. The handle 10 has a shaft 13 passing through a support or housing 14 and being secured to or integral with one of the cooperating elements 15 of a one-way spring or friction clutch and brake of generally known construction and having a cooperating clutch element 16, a coil spring 17 and a cylindrical housing 18, the latter being secured to or integral with the support 14, as shown in the drawing. Clutch elements 15 and 16 are provided with inter-engaging axial sector-shaped projections 20 and 21 (see Fig. 4) designed to provide a pair of radial gaps for receiving the hooked ends 22 of the spring 17 encircling the projections 20 and 21 and having its outside surface frictionally engaging the inside of housing 18.

In the example shown, the sector 20 is connected to the clutch element 15 and the sector 21 is connected to the clutch element 16, whereby with element 15 being rotated in either direction by the operation of the hand crank 10, pressure will be exerted upon the inner faces A of the hooked ends 22 of the spring 17, thus contracting the spring and releasing it from its frictional engagement with the housing 18, in such a manner as to allow of rotary motion to be transmitted freely to the clutch element 16 by way of the sector 21. On the other hand, rotation of the clutch element 16 and in turn of sector 21 will result in the latter pressing against the outer faces B of the hooked ends 22 of the spring 17, thus unwinding and tightening the latter firmly or locking it against the inside of housing 18, whereby to block transmission of power in the reverse direction from element 16 to clutch element 15. As a consequence, the clutch acts as a resilient one-way coupling means by allowing rotary motion to be transmitted freely from the handle 10 to the window operating mechanism, but blocking transmission or acting as a lock in the reverse direction.

Clutch element 16 is connected to the carrier 23 of a planetary gear assembly, said carrier rotatably supporting one or more planet gears 24 by means of shafts 25. The planet gears 24 are in meshing relation with both an outer internally toothed side or ring gear 26 and an inner externally toothed sun or side gear 29. Ring gear 26 is driven by an electric motor through a worm gear 27 engaging worm teeth cut upon the outer surface of gear 26, while the sun gear 29 is provided with a shaft or hub 28 which carries the window control gear 11. The carrier 23 which may be in the form of a solid disc or spider has a hollow shaft 30 extending inside a bore in the sun gear 27 and hub 28 and which in turn serves to receive an extension of shaft 13 of the hand crank for concentric mounting and guidance of the various elements.

In operation, rotation of the handle 10 will result in operation of the window mechanism through the action of the spring clutch, rotation of the carrier 23 driving the sun gear 29 through planet gears 24 which latter rotate upon the inner gear teeth of the ring gear 26, the latter being held stationary or locked against rotation by the worm 27. Vice versa, operation of the motor will result in rotation of the window operating gear 11 through rotation of the ring gear 26 and sun gear 29 by way of the planet gears 24 acting as idlers and by virtue of the carrier 23 being locked against rotation by the brake action of the spring clutch, as will be understood from the above.

It will be seen, therefore, from the foregoing that both the one-way spring clutch and brake 15—21 and the worm gear transmission 26—27 serve to perform the double and alternate functions of preventing the window from reacting upon the driving sources during both the manual and automatic operations, on the one hand, and of locking the carrier 23 and ring gear 26 of the planetary gear assembly during the automatic and manual window operations, respectively. At the same time, driving the window control gear 11 through the carrier 23 and planet gears 24 will result in a more favorable step-down transmission ratio between the hand crank 10 and the window operating mechanism.

Figure 2 shows schematically a window control mechanism mounted within an automobile door, comprising a multiple regulator according to the invention. Numeral 32 indicates the door, 33 represents the window frame and 34 a window pane mounted upon a support or channel member 35. The latter serves as a guide for a pair of rollers 36 which are attached to the ends of links 37 each of which is connected to one of a pair of operating gears or sectors 12 arranged in mutual meshing relation. One of said gears corresponds to the gear 12 of Fig. 1 and in turn meshes with the gear 11 of the regulator. Item 38 is an electrical motor driving the worm 27 by means of a shaft 40 and through an overload friction or slip clutch 41 of the type described in more detail in the above-mentioned co-pending application. The motor may be started to rotate in either direction by connecting it to a suitable current source such as the car battery 42 through a reversible and preferably self-centering control switch 43, in the manner shown and readily understood from the drawing.

As will be understood, the slip clutch 41 may be omitted when using a self-centering control switch, in that the operator will automatically release the switch and allow its return to the open or center position, as soon as the window reaches one of its end positions.

Referring to the construction shown in Figures 3 and 4, the latter differs from Figure 1 by the spring clutch being designed with a somewhat larger diameter, in which case the number of turns of the clutch spring may be reduced, resulting in a reduction of the axial dimension of the regulator. The planet gears 24 in this modification are directly rotatably supported by the clutch element 16 by means of pins or shafts 25, i. e. a special planetary carrier is not required, the driven or output clutch element and carrier being one and the same element. As a result, the axial dimension of the regulator is furthermore reduced, thus allowing its mounting in relatively narrow spaces provided by existing automobile doors. The remaining parts and the operation of Figures 3 and 4 are substantially similar to and readily understood from the description of Figure 1.

In the modification shown in Figure 5, the window control gear 12 is driven by the outer ring gear 26 of the planetary gear assembly, while the worm gear 27 drives the ring-shaped planetary carrier 23 rotatably mounted upon housing 18 of the spring clutch. During the manual operation, rotation is transmitted from the handle 10 through the spring clutch directly to the sun gear 29 and ring gear 26, with the planet gears 24 acting as idlers and with the carrier 23 being locked by the worm 27. During the motor driven operation, rotation is transmitted to the window driving gear 26 by the worm 27 through the carrier 23, planet gears 24 revolving upon the sun gear 29 held stationary by the spring brake and ring gear 26, in a manner readily understood from the foregoing. This design also results in a compact construction, especially in the transverse or axial direction, whereby to enable its mounting in relatively narrow door spaces.

As will be understood, the manual and automatic drives may be interchanged in the constructions of both Figures 3 and 5, i. e. the motor may be replaced by the handle and vice-versa, without substantially changing the operation of and results obtained by the regulator.

While there have been shown and described in the foregoing a few desirable embodiments of the invention, it is understood that this disclosure is for the purpose of illustration and that various changes in the size, shape and arrangements of parts, as well as the substitution of equivalent elements for those herein shown and described, may be made without departing from the scope and spirit of the invention as set forth in the appended claims. The specification and drawing are accordingly to be regarded in an illustrative rather than in a limiting sense.

I claim:

1. In a window regulator including operating mechanism for controlling a window, multiple differential drive means for optionally operating said mechanism by manual and/or automatic driving means, comprising a first side gear for driving said mechanism, a second side gear, a rotatable differential carrier and at least one planet gear rotatably supported by said carrier and meshing with both said side gears, a one-way spring brake and clutch having an input element connected to one of said driving means and an output element connected to said carrier for driving one of said side gears, and one-way worm gear drive means for uni-directionally transmitting rotary motion from the other driving means to the other side gear.

2. In a window regulator including operating mechanism for controlling a window, multiple differential coupling means for optionally operating said mechanism by manual and/or automatic driving means, comprising an internally toothed ring gear provided with worm teeth on its periphery, an externally toothed sun gear for driving said mechanism and being of lesser diameter than and coaxial with said ring gear, a rotatable differential carrier, at least one planet gear rotatably supported by said carrier and meshing with both said ring and sun gears, a one-way spring brake and clutch having an input element connected to one of said driving means and an output element connected to said carrier for driving one of said side gears, said input and output elements having interlocking axial extensions, and further irreversible coupling means for driving said ring gear by the other driving means in one direction while preventing it from being driven in the other direction when said carrier is driven.

3. In a window regulator including operating mechanism for controlling a window, multiple differential coupling means for optionally operating said mechanism by manual and/or automatic driving means, comprising an internally toothed ring gear provided with worm teeth on its periphery, an externally toothed sun gear for driving said mechanism and being of lesser diameter than and coaxial with said ring gear, a rotatable differential carrier, at least one planet gear rotatably supported by said carrier and meshing with both said ring and sun gears, a one-way spring brake and clutch having an input element connected to one of said driving means and an output element connected to said carrier for driving one of said side gears, said input and output elements having interlocking axial extensions, and a worm gear connectable to the other driving means and meshing with said worm teeth of said ring gear.

4. In a window regulator including operating mechanism for controlling a window, multiple differential coupling means for operating said mechanism by manual and/or automatic driving means, comprising a first side gear connectable to said mechanism, a second side gear, a rotatable differential carrier, at least one planet gear rotatably supported by said carrier and meshing with both said side gears, a clutch and spring brake comprising an input element connected to one of said driving means and an output element connected to said carrier for driving one of said side gears, said elements having interlocking axial extensions, a coil spring having hooked ends engaging radial gaps between said extensions, a support frictionally engaging said spring, whereby to allow of rotary motion to be transmitted freely to said output element from said input element by releasing said spring from said support and to block transmission in the reversed direction by tightening said spring against said support, and irreversible worm gear transmission means connectable to the other driving means for driving said second side gear.

5. In a window regulator including operating mechanism for controlling a window, multiple differential coupling means for operating said mechanism by manual and/or automatic driving means, comprising an internally toothed ring gear provided with worm teeth upon its periphery, an externally toothed sun gear of lesser diameter than and coaxial with said ring gear, a rotatable differential carrier, at least one planet gear rotatably supported by said carrier and meshing with both said ring and sun gears, a clutch and spring brake comprising an input element connectable to one of said driving means and an output element driving said carrier, said elements having interlocking sector-shaped axial extensions, a coil spring provided with hooked ends engaging radial gaps between said extensions, a stationary circular housing frictionally engaging said spring, whereby to allow of rotary motion to be transmitted freely from said input element to said output element by releasing said spring from said housing and to block transmission in the reverse direction by tightening said spring against said housing, means joined to said sun gear for driving said mechanism by said sun gear, and a worm gear meshing with said worm teeth and connectable to the other driving means.

6. In a window regulator, operating mechanism for optionally controlling a window by a pair of driving means including multiple coupling means comprising a one-way spring brake and clutch having an input element connected to a first driving means and an output element, a first side gear for driving said window, a second side gear, at least one planet gear rotatably supported by said output element and meshing with both said side gears, and means connected to said second side gear for retaining it stationary when said output element is rotated and for driving said second side gear when said output element is stationary.

7. In a window regulator including operating mechanism for controlling a window, means for optionally operating said mechanism by manual and/or automatic driving means, comprising a one-way spring brake and clutch having an input element connected to one of said driving means and to a disc-shaped output element, said elements having interlocking axial extensions, a coil spring encircling said extensions and having hooked ends engaging radial gaps between said extensions, a cylindrical support frictionally engaging said spring, an internally toothed ring gear provided with worm teeth upon its periphery, a coaxial externally toothed sun gear of lesser diameter than said ring gear and adapted for driving said mechanism, at least one planet gear rotatably supported by said output element and meshing with both said ring and sun gears, and a worm gear meshing with said worm teeth for uni-directionally transmitting rotary motion from the other driving means to said ring gear.

8. In a window regulator, a sun gear having external teeth, a ring gear having internal teeth, planet gears having teeth in mesh with the teeth of said sun and ring gears, a carrier for said planet gears, drive means on said sun gear for operating a window regulator, means in engagement with said sun gear for procuring its rotation while said ring gear is stationary for rotating said drive means, and means in engagement with said ring gear for procuring its rotation when said carrier is stationary for driving said planet gears, said sun gear and drive means, said means for retaining said carrier stationary embodying a one-way brake coaxial with said carrier which locks said carrier when the ring gear is driven.

9. In a window regulator, a sun gear having external teeth, a ring gear having internal teeth, planet gears having teeth in mesh with the teeth of said sun and ring gears, a carrier for said planet gears, drive means on said sun gear for operating a window regulator, means in engagement with said sun gear for procuring its rotation while said ring gear is stationary for rotating said drive means, means in engagement with said ring gear for procuring its rotation when said carrier is stationary for driving said planet gears, said sun gear and drive means, said means for retaining said carrier stationary embodying a one-way brake coaxial with said carrier which locks said carrier when the ring gear is driven, and said means for locking said ring gear embodying teeth on the outer periphery thereof in mesh with the thread of a worm having such slow lead as to prevent the ring gear from rotating when the carrier is driven.

KARL RATH.

REFERENCES CITED

The following references are of record in the file of this patent:

UNITED STATES PATENTS

| Number | Name | Date |
|---|---|---|
| 855,623 | Emerson | June 4, 1907 |
| 1,457,316 | Price | June 5, 1923 |
| 1,651,959 | Meyers | Dec. 6, 1927 |
| 2,319,842 | Benson | May 25, 1943 |
| 2,352,140 | Trott | June 20, 1944 |
| 2,387,215 | Fawkes | Oct. 16, 1945 |
| 2,437,646 | Matulaitis | Mar. 9, 1948 |

FOREIGN PATENTS

| Number | Country | Date |
|---|---|---|
| 360,041 | Italy | June 10, 1938 |
| 623,633 | France | June 28, 1927 |